United States Patent
Xu et al.

(10) Patent No.: US 12,555,031 B2
(45) Date of Patent: Feb. 17, 2026

(54) FEATURE GENERATION FOR TRAINING DATA SETS BASED ON UNLABELED DATA

(71) Applicant: International Business Machines Corporation, Armonk, NY (US)

(72) Inventors: Jing Xu, Xi'an (CN); Si Er Han, Xi'an (CN); Xue Ying Zhang, Xi'an (CN); Steven George Barbee, Amenia, NY (US); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 17/447,258

(22) Filed: Sep. 9, 2021

(65) Prior Publication Data
US 2023/0073137 A1   Mar. 9, 2023

(51) Int. Cl.
*G06N 20/00* (2019.01)
*G06F 18/214* (2023.01)
*G06F 18/23* (2023.01)

(52) U.S. Cl.
CPC ......... *G06N 20/00* (2019.01); *G06F 18/2155* (2023.01); *G06F 18/23* (2023.01)

(58) Field of Classification Search
CPC ...... G06F 18/2155; G06F 18/23; G06N 20/00
See application file for complete search history.

(56) References Cited

U.S. PATENT DOCUMENTS

| | | | |
|---|---|---|---|
| 11,443,235 B2 | 9/2022 | Xu et al. | |
| 2014/0201208 A1 | 7/2014 | Satish et al. | |
| 2020/0012963 A1 | 1/2020 | Johnston et al. | |
| 2020/0265218 A1* | 8/2020 | Dai | G06V 10/764 |
| 2021/0124967 A1 | 4/2021 | Xu | |
| 2021/0142046 A1 | 5/2021 | Yu et al. | |
| 2022/0027795 A1* | 1/2022 | Fogelson | G06V 10/507 |

* cited by examiner

*Primary Examiner* — Brent Johnston Hoover
(74) *Attorney, Agent, or Firm* — Yee & Associates, P.C.

(57) ABSTRACT

A computer implemented method for machine learning model training. A number of processor units creates a cluster model comprising labeled samples and unlabeled samples. The number of processor units identifies cluster information for the labeled samples from the cluster model. The number of processor units adds a set of new features to a set of original features for the labeled samples using the cluster information to form an extended set of features for the labeled samples, wherein the labeled samples with the set of original features and the set of new features form a training data set for training a machine learning model.

20 Claims, 7 Drawing Sheets

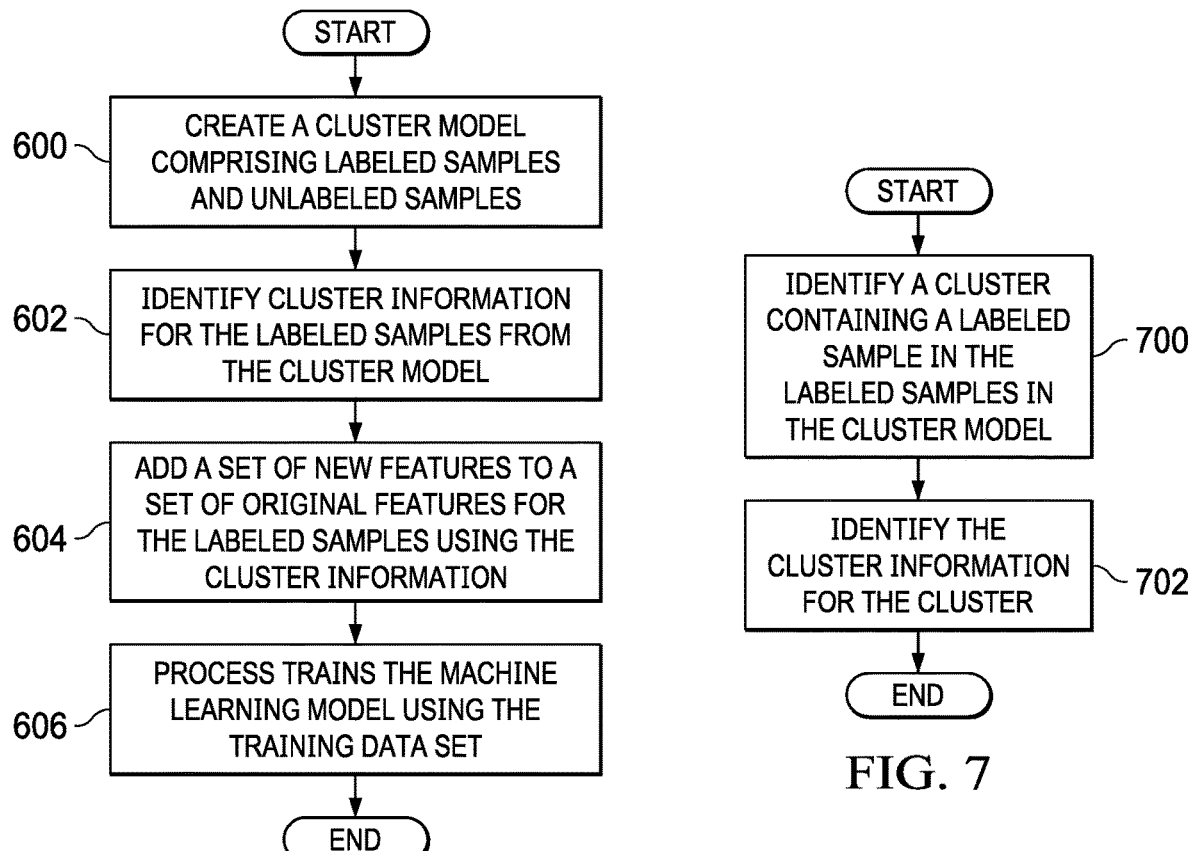
FIG. 6
FIG. 7
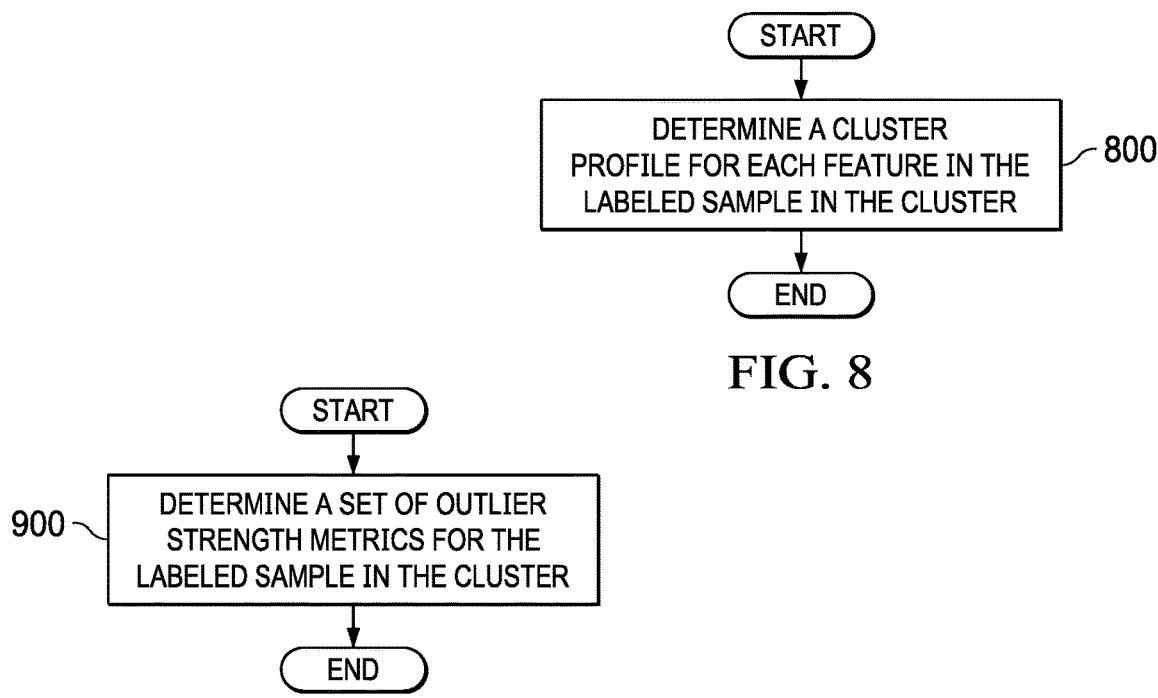
FIG. 8
FIG. 9

FEATURE GENERATION FOR TRAINING DATA SETS BASED ON UNLABELED DATA

BACKGROUND

1. Field

The disclosure relates generally to an improved computer system and more specifically to machine learning using labeled and unlabeled samples.

2. Description of the Related Art

Machine learning involves using machine learning algorithms to build machine learning models based on samples of data. The samples of data used for training referred to as training data or training data sets. Machine learning models trained using training data sets and make predictions without being explicitly programmed to make these predictions. Machine learning models can be trained for a number of different types of applications. These applications include, for example, medicine, healthcare, speech recognition, computer vision, or other types of applications.

These machine learning rhythms can include supervised machine learning algorithms and unsupervised machine learning algorithms. Supervised machine learning can train machine learning models using data containing both the inputs and desired outputs. Further, supervised machine learning involves using labels, which are, for example, the predefined target answers for input to the machine learning model. In other words, the label identifies the output or prediction that should be made based on input data.

SUMMARY

According to one illustrative embodiment, a computer implemented method for machine learning model training is provided. A number of processor units creates a cluster model comprising labeled samples and unlabeled samples. The number of processor units identifies cluster information for the labeled samples from the cluster model. The number of processor units adds a set of new features to a set of original features for the labeled samples using the cluster information, wherein the labeled samples with the set of original features and the set of new features form a training data set for training a machine learning model. According to other illustrative embodiments, a computer system and a computer program product for machine learning model training are provided.

BRIEF DESCRIPTION OF THE DRAWINGS

FIG. 6 is a flowchart of a process for machine learning model training in accordance with an illustrative embodiment;

FIG. 7 is a flowchart of a process for identifying cluster information in accordance with an illustrative embodiment;

FIG. 8 is a flowchart of a process identifying cluster information in accordance with an illustrative embodiment;

FIG. 9 is a flowchart of a process identifying cluster information in accordance with an illustrative embodiment;

DETAILED DESCRIPTION

Figure 1:
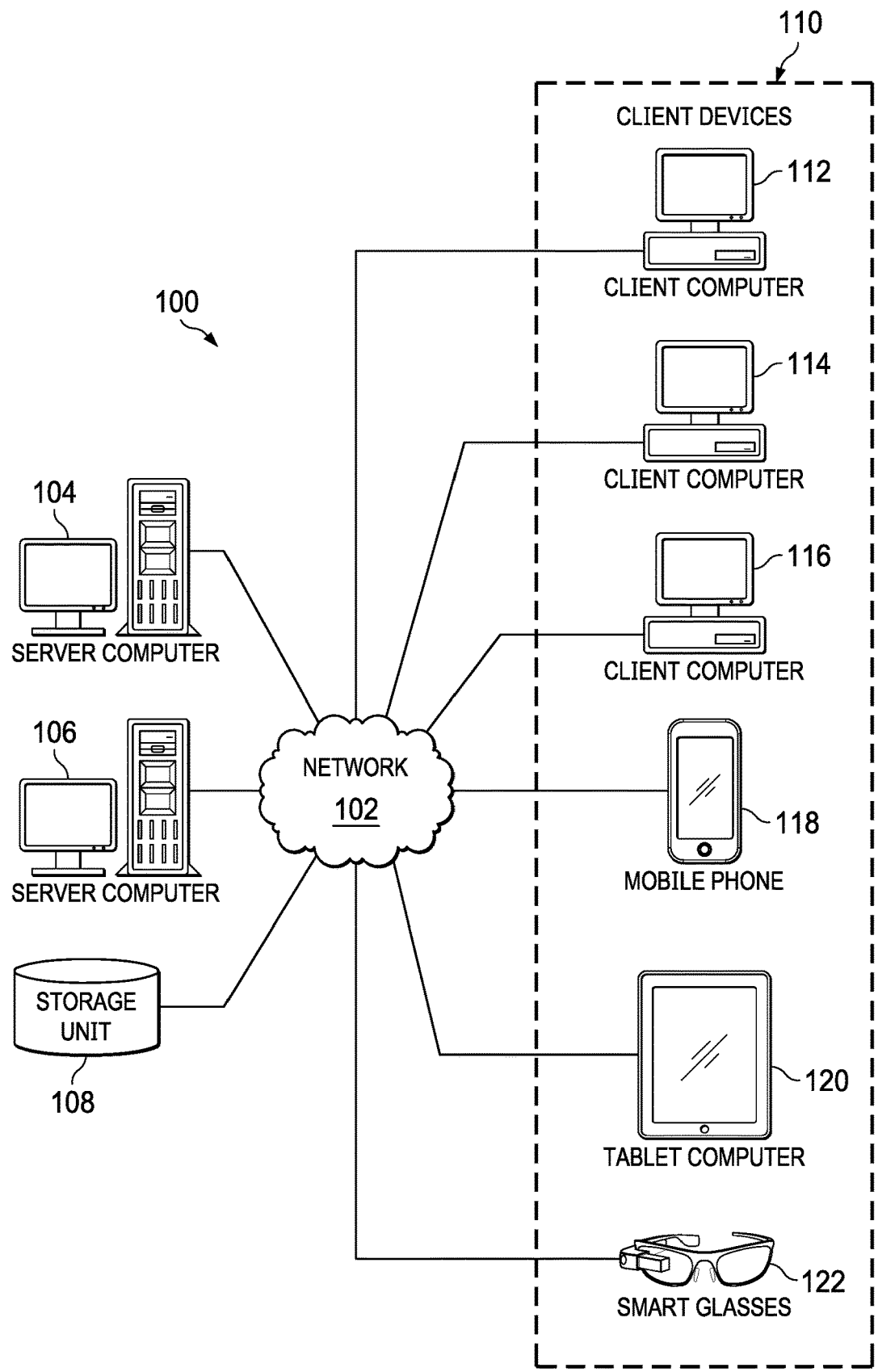
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative in training machine learning models using supervised machine learning techniques, the number of samples of data having labels may be small in comparison to the samples of data that do not have labels. A smaller number of labeled samples relative to labeled samples can occur because of the cost to label samples. For example, the illustrative embodiments recognize and take into account that with samples for fraud detection, finding and labeling actual cases of fraud may not be as easy as desired. The illustrative embodiments recognize and take accounts that many inquiries may be needed before cases can be correctly labeled.

As another example, the illustrative embodiments recognize and take into account that with some types of cases, the amount of time needed to determine the type of case may be longer than desired. For example, with healthcare cases, bills embodiments recognize and take into account that years may pass before a particular condition can be diagnosed as being present or absent. As a result, obtaining samples for predicting the particular condition may take much longer than desired.

The illustrative embodiments also recognize only labeled samples currently are used to train machine learning models to generate predictions. The left embodiments also recognize and take into account that with the imbalances between the number of labeled samples and unlabeled samples, the ability of machine learning models to generalize predictions beyond labeled samples is not as great as desired.

Thus, the illustrative embodiments recognize and take into account that it would be desirable to have a method, apparatus, system, and computer program product that overcomes issues with the amount of labeled samples that are typically present. The illustrative embodiments recognize and take into account that the unlabeled samples can also contain useful information that can be used in training machine learning models.

Thus, the illustrative embodiments can leverage both labeled samples and unlabeled samples to train machine learning models. The most embodiments can expand feature including new features derived from clustering labeled samples and unlabeled samples.

For example, in a computer implemented method for machine learning model training, a cluster model comprising labeled samples and unlabeled samples can be created. Cluster information can be identified for the labeled samples from the cluster model. A set of new features can be added to a set of original features for the labeled samples using the cluster information to form an extended set of features for the labeled samples. The labeled samples with the set of original features and the set of new features form a training data set for training a machine learning model. As a result, the training data set and have an expanded feature space that includes additional features obtained from the cluster information.

As used herein, "a set of" when used with reference to items means one or more items. For example, a set of new features is one or more new features.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wire, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
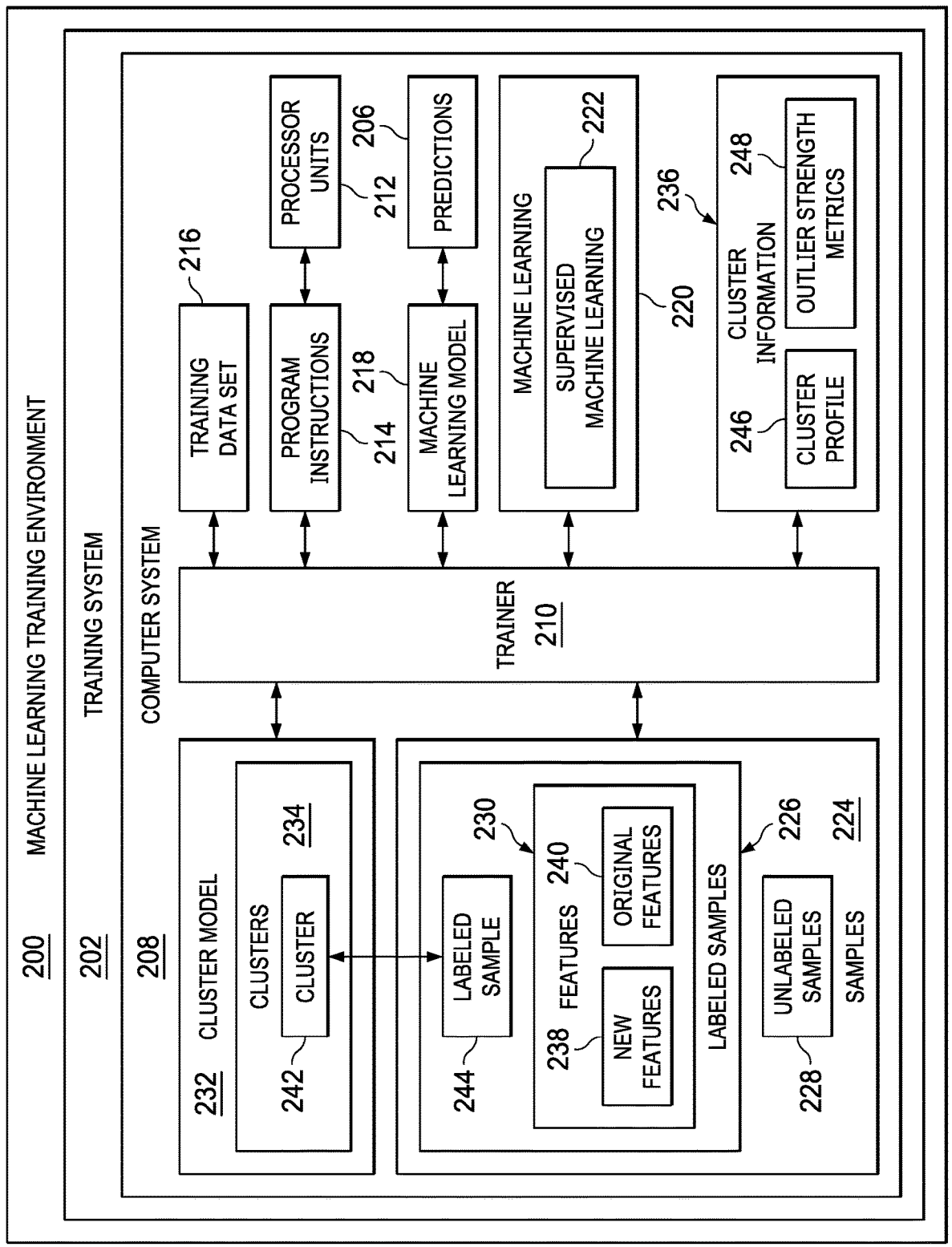
FIG. 2 is a block diagram of a machine learning training environment in accordance with an illustrative embodiment.

With reference now to FIG. 2, a block diagram of a machine learning training environment is depicted in accordance with an illustrative embodiment. In this illustrative example, machine learning training environment 200 includes components that can be implemented in hardware such as the hardware shown in network data processing system 100 in FIG. 1.

In this most of example, training system 202 in machine learning training environment 200 can train machine learning model 204 to generate predictions 206. As depicted, training system 202 comprises computer system 208 and trainer 210.

Trainer 210 can be implemented in software, hardware, firmware or a combination thereof. When software is used, the operations performed by trainer 210 can be implemented in program instructions configured to run on hardware, such as a processor unit. When firmware is used, the operations performed by trainer 210 can be implemented in program instructions and data and stored in persistent memory to run on a processor unit. When hardware is employed, the hardware can include circuits that operate to perform the operations in trainer 210.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

As depicted, computer system 208 includes a number of processor units 212 that are capable of executing program instructions 214 implementing processes in the illustrative examples. As used herein a processor unit in the number of processor units 212 is a hardware device and is comprised of hardware circuits such as those on an integrated circuit that respond and process instructions and program code that operate a computer. When a number of processor units 212 execute program instructions 214 for a process, the number of processor units 212 is one or more processor units that can be on the same computer or on different computers. In other words, the process can be distributed between processor units on the same or different computers in a computer system. Further, the number of processor units 212 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this most of example, trainer 210 can create training data set 216 for use in training machine learning model 218. Machine learning model 218 is a type of artificial intelligence model that can learn without being explicitly programmed. Machine learning model 218 can learn using training data set 216 input into machine learning model 218. Machine learning model 218 can learn using various types of machine learning 220. This also example, machine learning 220 can be performed using machine learning algorithms. In this illustrative example, machine learning algorithm implemented by machine learning 220 takes the form of supervised machine learning 222. In other illustrative examples, other types of machine learning algorithms including, for example, unsupervised learning, a feature learning, a sparse dictionary learning, an anomaly detection, association rules, or other types of learning algorithms. Examples of machine learning model 218 include an artificial neural network, a decision tree, a support vector machine, a Bayesian network, a genetic algorithm, and other types of models. Machine learning model 218 can be trained using training data set 216 and process additional data to provide a desired output such as a prediction.

In this illustrative example, trainer 210 uses samples 224 that include both labeled samples 226 and unlabeled samples 228 to create training data set 216. A sample in labeled samples 226 and unlabeled samples 228 can be a data structure comprising one of a record, a row in a table, a case, a file, and other data structures that can contain or store features for samples. A sample is a collection of data. A sample may have a single feature or may have multiple features. A feature can be, for example, a column in a table, a parameter, or a variable in a sample.

As depicted, trainer 210 creates cluster model 232 comprising labeled samples 226 and unlabeled samples 228 in samples 224. A cluster model, such as cluster model 232, is a grouping of observations. In this example, the grouping of observations is samples 224 that comprise labeled samples 226 and unlabeled samples 228.

In this illustrative example, samples 224 are multivariable feature samples in which each sample has more than one feature. The features can also be referred to as variables. In this depicted example, with multiple features in each of samples 224, cluster model 232 is a multivariable or a multifeatured model. In another example, samples 224 can be single feature samples in which each sample is a single feature.

In this illustrative example, trainer 210 identifies cluster information 236 for labeled samples 226 from cluster model 232. This illustrative example, trainer 210 can identify cluster information 236 in a number of different ways. The identification of cluster information 236 can be performed using various clustering and statistical analysis methodologies. For example, clusters 234 can be identified using algorithms such as centroid based clustering, distribution-based clustering, density based clustering, or other types of clustering techniques. For example, if centroid based clustering is used, k-means algorithms can be used to identify clusters 234 in samples 224 for cluster model 232.

Trainer 210 can identify cluster 242 in clusters 234 in cluster model 232 containing labeled sample 244 in labeled samples 226. Cluster 242 can also include a number of unlabeled samples 228 in addition to labeled sample 244. In another example, one or more additional unlabeled samples can be present in addition to labeled sample 226 in cluster 242. Trainer 210 can identify cluster information for cluster 242. This cluster information 236 identified in cluster 242 can be applied to add additional features to labeled sample 244.

In this illustrative example, in identifying cluster information 236, trainer 210 can determine cluster profile 246 for each feature in labeled sample 244 in cluster 242. A feature in features 230 can be selected from one of a continuous feature and a categorical feature.

Additionally, in identifying cluster information 236, trainer 210 can determine a set of outlier strength metrics 248 for labeled sample 244 in cluster 242. An outlier is observation that lies an abnormal distance from other values in a random sample from a population. Outlier strength metrics 248 can measure how far a sample is from other samples. Thus, cluster information 236 comprised cluster profile 246 and a set of outlier strength metrics 248.

Additionally, a set of outlier strength metrics 248 can also be used to provide guidance in collecting new samples. For example, clusters representing categories may not have a desired amount of samples. With this knowledge, focus on collecting more samples from selected categories can be made.

In this illustrative example, trainer 210 adds a set of new features 238 to the set of original features 240 for labeled samples 226 using cluster information 236. In this example, labeled samples 226 with the set of original features 240 and the set of new features 238 form training data set 216 for training machine learning model 218. In this manner, the number of features 230 in labeled samples 226 can be expanded to provide more information for training machine learning model 218.

Trainer 210 can train machine learning model 218 using training data set 216 having labeled samples 226 containing both the set of original features 240 and the set of new features 238. Thus, the set of new features 238 derived from the analysis of clusters 234, including both labeled samples 226 and unlabeled samples 228, can be used to increase the number of features 230 in labeled samples 226 that would otherwise be unavailable for training.

In the illustrative example, machine learning model 218 trained using training data set 216 can generate predictions 206. With training data set 216, more generalization in predictions 206 beyond labeled samples 226 can be made by machine learning model 218 than if training data set 216 did not include the expanded set of features, the set of new features 238, provided using cluster information 236.

In one illustrative example, one or more technical solutions are present that overcome a technical problem with training machine learning models with a limited amount of labeled samples. As a result, one or more illustrative examples can enable increasing the amount of information in labeled samples for use in training machine learning models by identifying the increased information through analyzing clusters of samples in which labeled samples are present in the clusters with unlabeled samples. The analysis of the cluster information can be added to the information already present for the labeled samples. Thus, one or more illustrative examples can increase the number of features present for labeled samples in creating training data sets for training machine learning models.

Computer system 208 can be configured to perform at least one of the steps, operations, or actions described in the different illustrative examples using software, hardware, firmware or a combination thereof. As a result, computer system 208 operates as a special purpose computer system in which trainer 210 in computer system 208 enables training machine learning models having an to generate more generalized predictions when limited amounts of labeled samples are present as compared to currently available techniques. In illustrative example, computer system 208 can have improved performance in generating predictions using these machine learning models. In particular, trainer 210 transforms computer system 208 into a special purpose computer system as compared to currently available general computer systems that do not have trainer 210.

In the illustrative example, the use of trainer 210 in computer system 208 integrates processes into a practical application for training machine learning models that increase the performance of computer system 208. In other words, trainer 210 in computer system 208 is directed to a practical application of processes integrated into trainer 210 in computer system 208 that creates training data sets from a limited number of labeled samples through leveraging cluster information that can be determined from clustering the labeled samples with unlabeled samples. As a result, machine learning models trained using these training data sets by trainer 210 in computer system 208 can provide more generalized predictions as compared to current training techniques. As a result, the performance of computer system 208 in generating predictions using machine learning models can improve current systems that do not employ trainer 210.

The illustration of machine learning training environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, trainer 210 can train one or more machine learning models in addition to machine learning model 218. Further, in some list of examples, cluster information 236 use cluster profile 246 as the set of new features 238 without outlier strength metrics 248. In yet other list of examples, cluster information 236 use outlier strength metrics 248 as the set of new features 238 without cluster profile 246.

Figure 3:
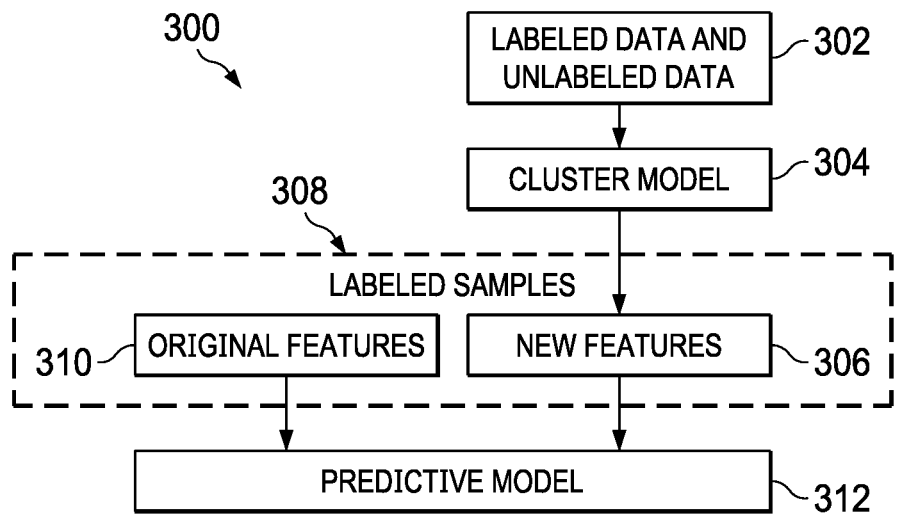
FIG. 3 is a block diagram of data flow building a predictive model in accordance with an illustrative embodiment.

Trying to FIG. 3, a block diagram of data flow building a predictive model is depicted in accordance with an illustrative embodiment. In this illustrative example, a predictive model such as machine learning model 218 in FIG. 2 can be created by trainer 210 using dataflow 300. As depicted, labeled data and unlabeled data 302 are used to build cluster model 304.

New features 306 are derived for labeled samples 308. These new features are added to original features 310 in labeled samples 308. Predictive model 312 is built using labeled samples 308. Predictive model 312 can be built training a machine learning model using labeled samples 308 having original features 310 and new features 306.

Figure 4:
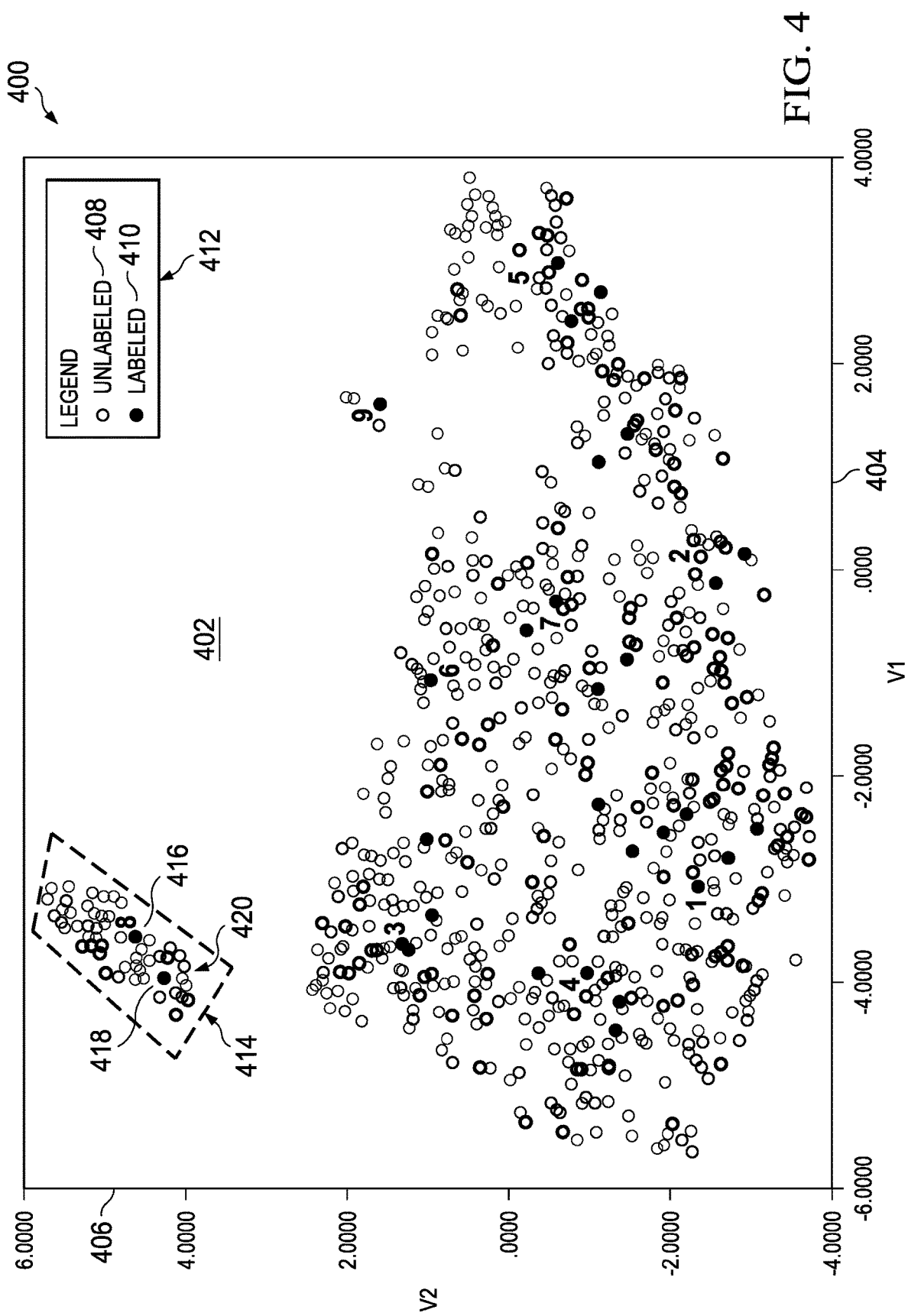
FIG. 4 is a cluster model in accordance with an illustrative embodiment.

With reference now to FIG. 4, a cluster model is depicted in accordance with an illustrative embodiment. As depicted, visualization of cluster model 400 been shown in graph 402. Cluster model 400 is an example of an implementation for cluster model 232 shown in block form in FIG. 2.

In this example, cluster model 400 is a two feature cluster model in which each sample has two features. As depicted, x-axis 404 is for feature V1, and y-axis 406 is for feature V2. These features can also be referred to as variables which cluster model 400 is a multivariable cluster model with two variables. In this example, the samples include labeled samples and unlabeled samples as indicated by unlabeled 408 and labeled 410 in legend 412.

Various clustering techniques can be used to identify clusters of samples in cluster model 400. In this example, 8 clusters are present from which cluster information can be determined. For example, cluster 8 414 has labeled sample 416, labeled sample 418, and unlabeled samples 420. Cluster information can be determined for cluster 8 414. For example, a cluster profile can be determined for each feature. Additionally, outlier strength metrics can also be determined. This information can be added to labeled sample 416 and labeled sample 418. The ability to obtain this information is enabled through obtaining more samples by considering unlabeled samples 420 within cluster 414. As a result, new features in addition to V1 and V2 can be added to these labeled samples for use in training machine learning model.

Figure 5:
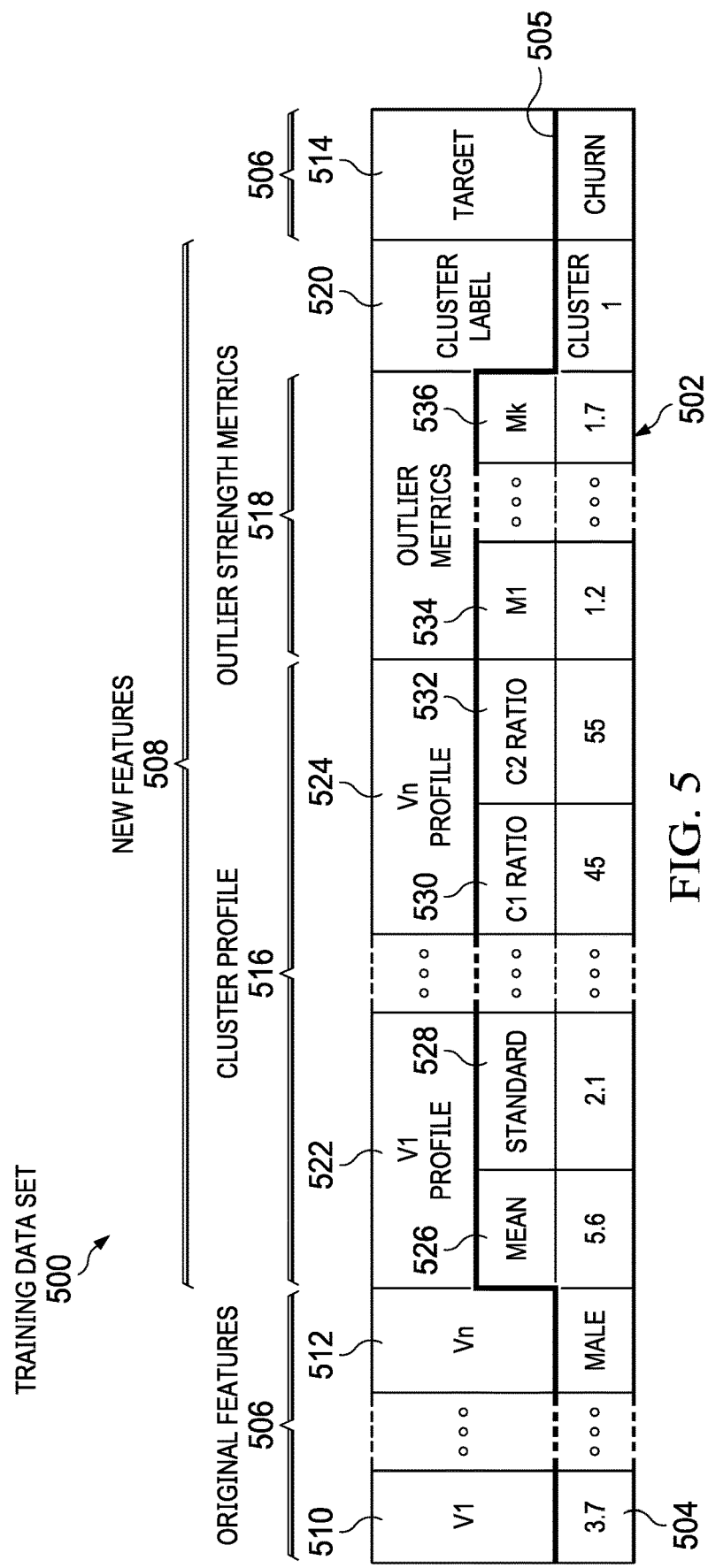
FIG. 5 is a training data set in accordance with an alleged embodiment.

With reference to FIG. 5, a training data set is depicted in accordance with an alleged embodiment. Training data set 500 is an example of an implementation for training data set 216 shown a block form in FIG. 2.

In this illustrate example, training data set 500 takes the form of table 502. In this illustrative example, labeled sample 504 in row 505 is an example of training data in training data set 500. In the depicted example, row 505 for labeled sample 504 contains original features 506, and new features 508.

Original features 506 are features regionally present for labeled sample 504. In this illustrative example, regional features include features V1 510 through Vn 512 and target 514. Target 514 is the label for labeled sample 504.

New features 508 are features derived from the cluster in which labeled sample 504 is located in a cluster model. In this illustrative example, these new features 508 include cluster profile 516, outlier strength metrics 518, and cluster label 520.

As depicted, cluster profile 516 comprises cluster profile V1 522 through cluster profile Vn 524. In other words, a cluster profile is present for each feature in labeled sample 504. As depicted, each cluster profile has information for a feature. For example, cluster profile V1 522 is for continuous feature and includes mean 526 and standard deviation 528. As another example, cluster profile V2 524 is for a categorical feature. With this type of feature, cluster profile V2 524 comprises C1 ratio 530 and C2 ratio 532.

A cluster profile is determined for a labeled sample by identifying the cluster in which the labeled sample belongs to. Thereafter, statistical calculations are performed for that cluster. For example, with a continuous feature, statistics such as a mean, standard deviation, and other suitable statistics can be determined. For categorical feature, statistics can include category distribution.

In this illustrative example, outlier strength metrics 518 can include one or more metrics regarding outlier strength. In this example, outlier strength metrics 518 comprises metric M1 534 through metric Mk 536. Outlier strength metrics can be determined using a number of different statistical analysis techniques. For example, outlier strength of a case $c_s$ is computed as:

$$O(s) = \sum_{j=1}^{J} \frac{\tilde{d}(j,s)}{D_t(j)} p(j \mid s),$$

where $D_t(j)$ is the distance threshold of cluster $C_j$, which is the maximum distance from cluster $C_j$ to each case which belongs to cluster $C_j$, $\tilde{d}(j,s)$ is the distance from cluster $C_j$ to the case $c_s$, and $p(j|s)$ is the probability of case $c_s$ belonging to cluster $C_j$, that is:

$$p(j \mid s) = \frac{\exp(-\tilde{d}(j,s))}{\sum_{j=1}^{J} \exp(-\tilde{d}(j,s))}.$$

This outlier strength analysis technique yields a single value for the metric. Other outlier strength analysis techniques can also be used in other illustrative examples. For example, silhouette can be used to determine outlier strength metrics. This technique to determine how similar one sample is to its own cluster as compared to other clusters.

The Illustration of training data set 500 is provided as an example of one training data set and not meant to limit the manner in which other training datasets can be implemented. For example, another training date set may include a cluster profile but not outlier strength metrics. In yet another illustrative example, the training data set may include outlier strength metrics but not a cluster profile. In yet another illustrative example, outlier strength metrics 518 may comprise a single metric instead of multiple metrics.

Turning next to FIG. 6, flowchart of a process for machine learning model training is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in trainer 210 in computer system 208 in FIG. 2.

The process begins by creating a cluster model comprising labeled samples and unlabeled samples (step 600). The process identifies cluster information for the labeled samples from the cluster model (step 602).

The process adds a set of new features to a set of original features for the labeled samples using the cluster information (step 604). In step 604, the labeled samples with the set of original features and the set of new features form a training data set for training a machine learning model.

The process trains the machine learning model using the training data set (step 606). The process terminates thereafter.

With reference to FIG. 7, a flowchart of a process for identifying cluster information is depicted in accordance with an illustrative embodiment. The process in FIG. 7 is an example of an implementation for step 602 in FIG. 6.

The process identifies a cluster containing a labeled sample in the labeled samples in the cluster model (step 700). In step 700, the cluster includes a number of the unlabeled samples in addition to the labeled sample.

The process identifies the cluster information for the cluster (step 702). The process terminates thereafter. These steps can be performed for each labeled sample in the labeled samples for the training data set.

In FIG. 8, a flowchart of a process identifying cluster information is depicted in accordance with an illustrative embodiment. The process in FIG. 8 is an example of an implementation for step 702 in FIG. 7.

The process determines a cluster profile for each feature in the labeled sample in the cluster (step 800). The process terminates thereafter.

With reference next to FIG. 9, a flowchart of a process identifying cluster information is depicted in accordance with an illustrative embodiment. The process in FIG. 9 is an example of an implementation for step 702 in FIG. 7.

The process determines a set of outlier strength metrics for the labeled sample in the cluster (step 900). The process terminates thereafter.

Figure 10:
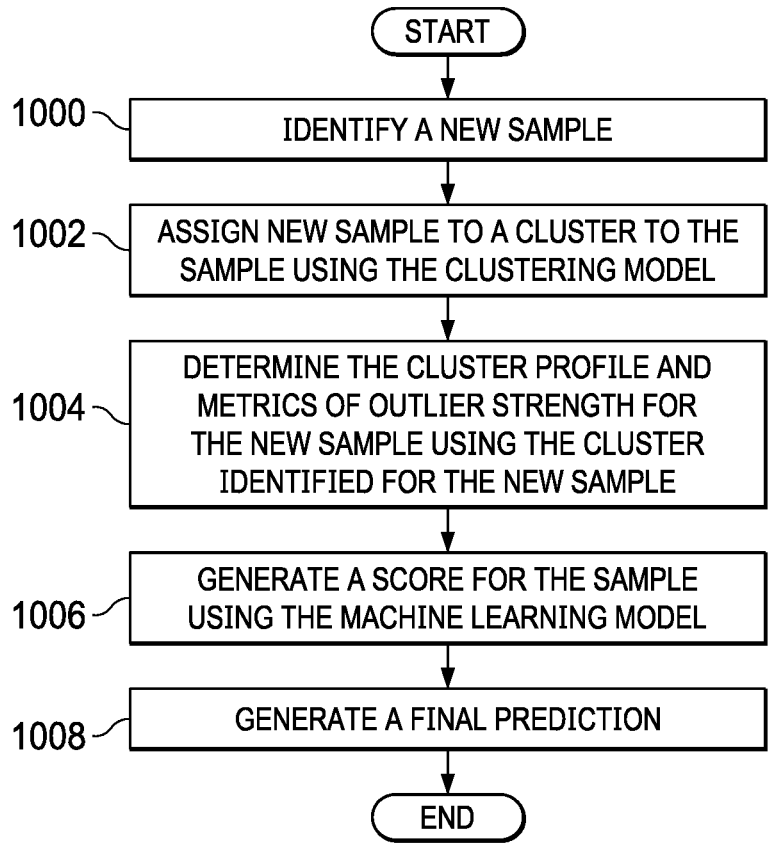
FIG. 10 is a flowchart of a process scoring in accordance with an illustrative embodiment.

Turning now to FIG. 10, a flowchart of a process scoring is depicted in accordance with an illustrative embodiment. The process in FIG. 10 can be implemented in hardware, software, or both. When implemented in software, the process can take the form of program instructions that is run by one of more processor units located in one or more hardware devices in one or more computer systems. For example, the process can be implemented in trainer 210 in computer system 208 in FIG. 2. This process can be used to generate a score when processing a new sample not used to train the machine learning model.

The process begins by identifying a new sample (step 1000). The process assigns the new sample to a cluster to the sample using the clustering model (step 1002). The process determines the cluster profile and metrics of outlier strength for the new sample using the cluster identified for the new sample (step 1004).

The process generates a score for the sample using the machine learning model (step 1006). This score can be a value or percentage indicating the likelihood that the prediction made is correct.

The process generates a final prediction (step 1008) with the process determining thereafter. The final prediction can be the score or can be based on a threshold. In other words, prediction can be a first result if the score is greater than the threshold and a second result of the score is less than or equal to the threshold.

Further, in one illustrative example, the new sample can have a known prediction or result. In this case, the new sample can be used to validate the accuracy of the machine learning model.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
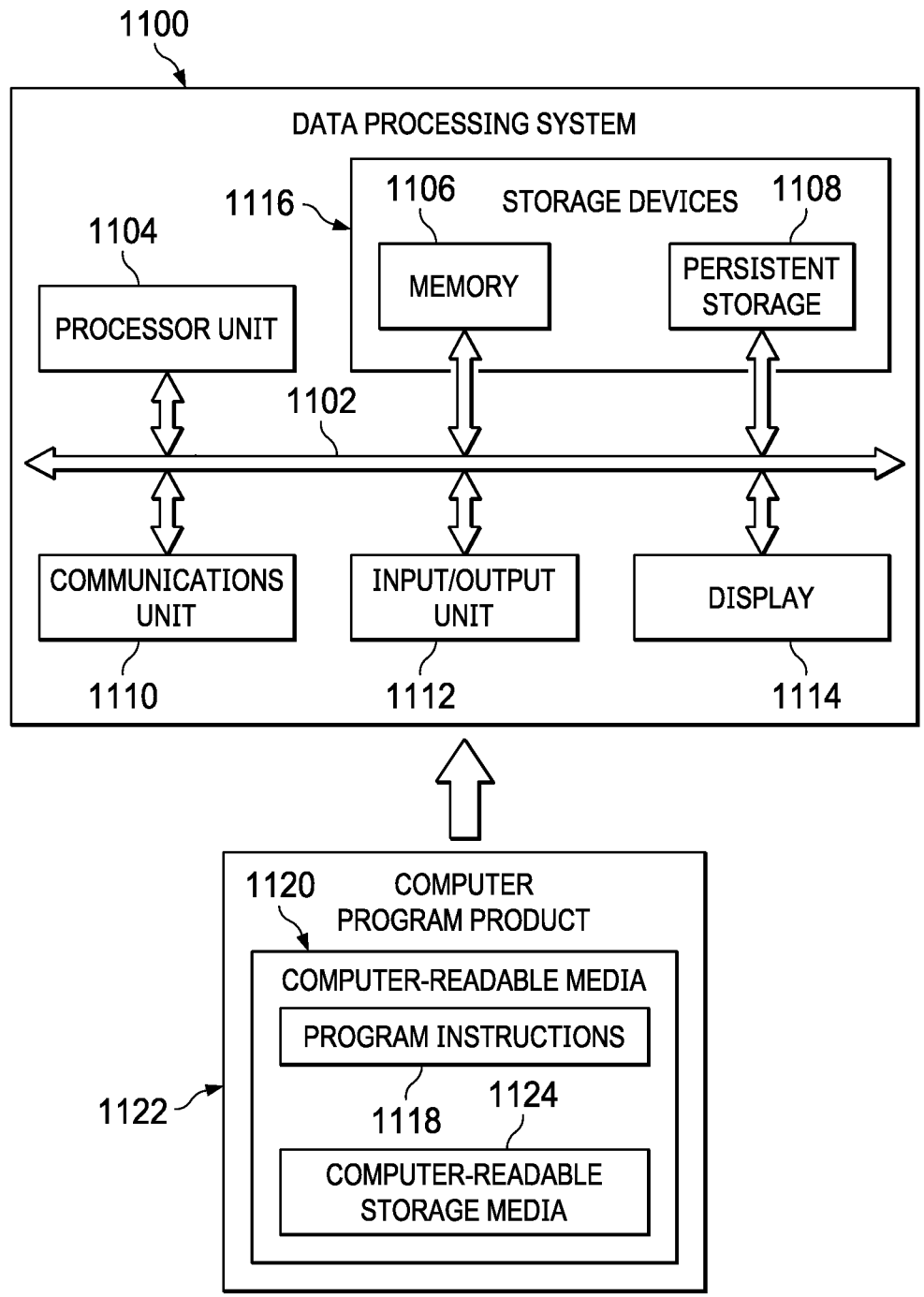
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, client devices 110, in FIG. 1. Data processing system 1100 can also be used to implement computer system 208 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 can also be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program instructions, computer usable program instructions, or computer-readable program instructions that can be read and executed by a processor in processor unit 1104. The program instructions in the different embodiments can be embodied on different physical or computer-readable storage media, such as memory 1106 or persistent storage 1108.

Program instructions 1118 is located in a functional form on computer-readable media 1120 that is selectively removable and can be loaded onto or transferred to data processing system 1100 for execution by processor unit 1104. Program instructions 1118 and computer-readable media 1120 form computer program product 1122 in these illustrative examples. In the illustrative example, computer-readable media 1120 is computer-readable storage media 1124.

Computer-readable storage media 1124 is a physical or tangible storage device used to store program instructions 1118 rather than a medium that propagates or transmits program instructions 1118. Computer readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1118 can be transferred to data processing system 1100 using a computer-readable signal media. The computer-readable signal media are signals and can be, for example, a propagated data signal containing program instructions 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program instructions 1118 can be located in computer-readable media 1120 in the form of a single storage device or system. In another example, program instructions 1118 can be located in computer-readable media 1120 that is distributed in multiple data processing systems. In other words, some instructions in program instructions 1118 can be located in one data processing system while other instructions in program instructions 1118 can be located in another data processing system. For example, a portion of program instructions 1118 can be located in computer-readable media 1120 in a server computer while another portion of program instructions 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program instructions 1118.

Thus, illustrative embodiments of the present invention provide a computer implemented method, computer system, and computer program product for machine learning model training. A number of processor units creates a cluster model comprising labeled samples and unlabeled samples. The number of processor units identifies cluster information for the labeled samples from the cluster model. The number of processor units adds a set of new features to a set of original features for the labeled samples using the cluster information to form an extended set of features for the labeled samples, wherein the labeled samples with the set of original features and the set of new features form a training data set for training a machine learning model.

Thus, when the number of labeled samples is lower than desired, these labeled samples can be enriched with additional information in the form of new features identified through clustering labeled samples with unlabeled samples and performing analysis of the clusters which labeled samples are present.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for machine learning model training, the computer implemented method comprising:

creating, by a number of processor units, a cluster model comprising labeled samples and unlabeled samples, wherein the unlabeled samples outnumber the labeled samples, and the cluster model is generated using a clustering algorithm selected from at least one of centroid based clustering, distribution-based clustering, and density based clustering;

identifying, by the number of processor units, cluster information for the labeled samples from the cluster model, wherein the cluster information comprises at least one of: cluster membership probabilities, distances to cluster centroids, and inter-sample similarities, and relationships between samples in the cluster wherein the cluster membership probabilities allow a single data point to belong to a first cluster with a first probability and a second cluster with a second probability, and utilizing a predefined distance metric to cluster centroids;

adding, by the number of processor units, a set of new features to a set of original features for the labeled samples using the cluster information, wherein the set of new features comprise numerical representation relationships that capture semantic and structural relationships between the labeled samples and the unlabeled samples within the cluster model, wherein the set of new features are computationally derived from statistical analysis of clusters containing both labeled and unlabeled samples and cannot be determined from the labeled samples alone;

forming a training dataset comprising the labeled samples with the set of original features and the set of new features forming an enhanced training data set that mitigates class imbalance, reduces noise, and incorporates additional contextual relationships between the labeled samples and the unlabeled samples; and training the machine learning model using the enhanced training data set, wherein training comprises executing gradient-based optimization operations by the number of processor units to iteratively adjust model parameters based on the enhanced training data set, wherein the trained machine learning model demonstrates improved performance metrics including at least one of accuracy, precision, recall, and F1 score, compared to a baseline model trained only with the set of original features, thereby improving the computational efficiency and prediction accuracy of the computer system.

2. The computer implemented method of claim 1, wherein identifying, by the number of processor units, the cluster information for a cluster comprises:

determining, by the number of processor units, a cluster profile for each feature in a labeled sample in the cluster.

3. The computer implemented method of claim 2, wherein a feature is selected from one of a continuous feature and a categorical feature.

4. The computer implemented method of claim 1, wherein identifying, by the number of processor units, the cluster information for a cluster comprises:

determining, by the number of processor units, a set of outlier strength metrics for a labeled sample in the cluster.

5. The computer implemented method of claim 1, wherein the cluster information comprises a cluster profile and a set of outlier metrics.

6. The computer implemented method of claim 1, wherein a sample in the labeled samples and the unlabeled samples comprises one of a record, a row in a table, a case, and a file.

7. The computer implemented method of claim 1, wherein the cluster information is used to generate feature importance scores that explain the predictions made by the trained machine learning model.

8. The computer implemented method of claim 1, wherein the machine learning model is trained using a gradient-based optimization algorithm implemented with hardware acceleration on a graphics processing unit (GPU).

9. A computer system for machine learning model training comprising:
  a number of processor units, wherein the number of processor units execute program instructions to:
    create a cluster model comprising labeled samples and unlabeled samples, wherein the unlabeled samples outnumber the labeled samples, and the cluster model is generated using a clustering algorithm selected from at least one of centroid based clustering, distribution-based clustering, and density based clustering;
    identify cluster information for the labeled samples from the cluster model, wherein the cluster information comprises at least one of: cluster membership probabilities, distances to cluster centroids, and inter-sample similarities, and relationships between samples in the cluster wherein the cluster membership probabilities allow a single data point to belong to a first cluster with a first probability and a second cluster with a second probability, and utilizing a predefined distance metric to cluster centroids;
    add a set of new features to a set of original features for the labeled samples using the cluster information, wherein the set of new features comprise numerical representation relationships that capture semantic and structural relationships between the labeled samples and the unlabeled samples within the cluster model, wherein the set of new features are computationally derived from statistical analysis of clusters containing both labeled and unlabeled samples and cannot be determined from the labeled samples alone;
    form a training dataset comprising the labeled samples with the set of original features and the set of new features forming an enhanced training data set that mitigates class imbalance, reduces noise, and incorporates additional contextual relationships between the labeled samples and the unlabeled samples; and
    train the machine learning model using the enhanced training data set, wherein training comprises executing gradient-based optimization operations by the number of processor units to iteratively adjust model parameters based on the enhanced training data set, wherein the trained machine learning model demonstrates improved performance metrics including at least one of accuracy, precision, recall, and F1 score, compared to a baseline model trained only with the set of original features, thereby improving the computational efficiency and prediction accuracy of the computer system.

10. The computer system of claim 9, wherein in identifying the cluster information for a cluster, wherein the number of processor units executes the program instructions to:
  determine a cluster profile for each feature in a labeled sample in the cluster.

11. The computer system of claim 10, wherein a feature is selected from one of a continuous feature and a categorical feature.

12. The computer system of claim 9, wherein identifying, by the number of processor units, the cluster information for a cluster comprises:
  determine a set of outlier strength metrics for a labeled sample in the cluster.

13. The computer system of claim 9, wherein the cluster information comprises a cluster profile and a set of outlier metrics.

14. The computer system of claim 9, wherein a sample in the labeled samples and the unlabeled samples comprises one of a record, a row in a table, a case, and a file.

15. The computer system of claim 9, wherein the cluster information is used to generate feature importance scores that explain the predictions made by the trained machine learning model.

16. The computer system of claim 9, wherein the machine learning model is trained using a gradient-based optimization algorithm implemented with hardware acceleration on a graphics processing unit (GPU).

17. A computer program product for machine learning model training, the computer program product comprising:
  a computer readable storage medium having program instructions embodied therewith, the program instructions executable by a computer system to cause the computer system to perform a method of:
    creating, by a number of processor units, a cluster model comprising labeled samples and unlabeled samples, wherein the unlabeled samples outnumber the labeled samples, and the cluster model is generated using a clustering algorithm selected from at least one of centroid based clustering, distribution-based clustering, and density based clustering;
    identifying, by the number of processor units, cluster information for the labeled samples from the cluster model, wherein the cluster information comprises at least one of: cluster membership probabilities, distances to cluster centroids, and inter-sample similarities, and relationships between samples in the cluster wherein the cluster membership probabilities allow a single data point to belong to a first cluster with a first probability and a second cluster with a second probability, and utilizing a predefined distance metric to cluster centroids;
    adding, by the number of processor units, a set of new features to a set of original features for the labeled samples using the cluster information, wherein the set of new features comprise numerical representation relationships that capture semantic and structural relationships between the labeled samples and the unlabeled samples within the cluster model, wherein the set of new features are computationally derived from statistical analysis of clusters containing both labeled and unlabeled samples and cannot be determined from the labeled samples alone;
    forming a training dataset comprising the labeled samples with the set of original features and the set of new features forming an enhanced training data set that mitigates class imbalance, reduces noise, and incorporates additional contextual relationships between the labeled samples and the unlabeled samples; and
    training the machine learning model using the enhanced training data set, wherein training comprises executing gradient-based optimization operations by the number of processor units to iteratively adjust model parameters based on the enhanced training data set, wherein the trained machine learning model demonstrates improved performance metrics including at least one of accuracy, precision, recall, and F1 score, compared to a baseline model trained only with the set of original features, thereby improving the computational efficiency and prediction accuracy of the computer system.

18. The computer program product of claim 17, wherein identifying, by the number of processor units, the cluster information for a cluster comprises:
- determining, by the number of processor units, a cluster profile for each feature in a labeled sample in the cluster; and
- determining, by the number of processor units, a set of outlier strength metrics for the labeled sample in the cluster.

19. The computer program product of claim 17, wherein the cluster information is used to generate feature importance scores that explain the predictions made by the trained machine learning model.

20. The computer program product of claim 17, wherein the machine learning model is trained using a gradient-based optimization algorithm implemented with hardware acceleration on a graphics processing unit (GPU).

* * * * *